(12) United States Patent
Sun et al.

(10) Patent No.: US 9,926,419 B2
(45) Date of Patent: Mar. 27, 2018

(54) POLYURETHANE COMPOSITE MATERIAL AND PROCESS FOR PREPARING SAME

(71) Applicant: Covestro Deutschland AG, Leverkusen (DE)

(72) Inventors: Guobin Sun, Shanghai (CN); Fie Wu, Hubei (CN); James Zhan Chen, Shanghai (CN); Hui Zhao, Shanghai (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/322,985

(22) PCT Filed: Jun. 26, 2015

(86) PCT No.: PCT/EP2015/064583
§ 371 (c)(1),
(2) Date: Dec. 29, 2016

(87) PCT Pub. No.: WO2016/001100
PCT Pub. Date: Jan. 7, 2016

(65) Prior Publication Data
US 2017/0130019 A1    May 11, 2017

(30) Foreign Application Priority Data
Jun. 30, 2014  (CN) .......................... 2014 1 0326723

(51) Int. Cl.
*C08L 75/00*   (2006.01)
*C08J 7/16*    (2006.01)
*C08K 7/14*    (2006.01)

(52) U.S. Cl.
CPC  *C08J 7/16* (2013.01); *C08K 7/14* (2013.01); *C08J 2375/16* (2013.01)

(58) Field of Classification Search
CPC ............ C08J 7/16; C08J 2375/16; C08K 7/14
USPC ......................................................... 524/590
See application file for complete search history.

(56) References Cited

U.S. PATENT DOCUMENTS

| | | | | |
|---|---|---|---|---|
| 4,522,969 | A * | 6/1985 | O'Connor | C08F 299/065 524/425 |
| 5,159,044 | A * | 10/1992 | Bogner | C08G 18/672 525/17 |
| 6,136,883 | A | 10/2000 | Yang et al. | |
| 6,455,606 | B1 * | 9/2002 | Kaku | C08G 18/4072 521/137 |
| 2005/0238884 | A1 | 10/2005 | Peters et al. | |

OTHER PUBLICATIONS

International Search Report and Written Opinion for International Application No. PCT/EP2015/064583, European Patent Office, dated Nov. 17, 2016.

* cited by examiner

*Primary Examiner* — Hui H Chin
(74) *Attorney, Agent, or Firm* — K&L Gates LLP

(57) ABSTRACT

The present invention relates to a process for preparing a polyurethane composite material, comprising steps of: I) preparing a premolded polyurethane molding body, wherein the premolded polyurethane molding body is prepared from a polyurethane composition under a condition that isocyanate groups and isocyanate-reactive groups comprised in the polyurethane composition undergo an addition reaction; II) curing the premolded polyurethane molding body to prepare the polyurethane composite material, wherein the premolded polyurethane molding body cures by the radical polymerization of active olefinic bonds. The process of the present application has a lower TVOC value and better processability.

7 Claims, No Drawings

POLYURETHANE COMPOSITE MATERIAL AND PROCESS FOR PREPARING SAME

CROSS-REFERENCE TO RELATED APPLICATIONS

This application is a U.S. national stage application, filed under 35 U.S.C. § 371, of PCT/EP2015/064583, which was filed on Jun. 26, 2015, and which claims priority to Chinese Patent Application No. CN 201410326723.0, filed Jun. 30, 2014, the contents of which are incorporated by reference into this specification.

FIELD OF THE INVENTION

In one aspect, the invention relates to a process for preparing a polyurethane composite material, particularly to a process for preparing a polyurethane composite material from a polyurethane composition by a sheet or bulk molding process, wherein the polyurethane composition comprises an organic isocyanate, an organic polyol and hydroxyalkyl (meth)acrylate. In another aspect, the invention relates to a polyurethane composite material prepared according to the above process.

BACKGROUND OF THE INVENTION

Polyurethane resin matrices are a type of highly cross-linked thermosetting high molecular materials which may be used for preparing polyurethane composite materials. Compared with traditional unsaturated resin and vinyl ester resin systems, polyurethane resins are characterized by excellent fatigue resistance and chemical corrosion resistance, superior impact toughness, low shrinkage and absence of styrene, etc. Hence, they are used in the composite material field more and more frequently.

The molding compound of unsaturated polyester resin or vinyl resin used in the prior art molding process may be stored for at least 3 months at 25° C. due to the addition of a polymerization inhibitor. In contrast, because of the extremely high activity of the isocyanate component, reaction will occur very quickly once polyurethane resin is mixed fully with a polyol component, leading to gelling and curing within several seconds to a couple of hours, such that the polyurethane molding compound loses mobility or becomes very stiff. As a result, the polyurethane molding compound is neither easy to be cut, nor can it be laid in a particularly shaped mold to be pressed into an article having a complex shape. Consequently, it can not be subject to molding. As such, the storage lifetime of a polyurethane molding compound prepared according the prior art process is generally no longer than 24 hours, which limits the use of a polyurethane composite material in a molding process badly.

On the other hand, a molding process in which unsaturated polyester resin or vinyl resin is used entails a large quantity of small molecular reactive monomers containing vinyl group, such as styrene, diphenylethylene and methyl methacrylate. When the molding process is completed, there are still a lot of residual small molecular monomers which become a source of VOC (volatile organic compounds), bringing about a high TVOC (Total Volatile Organic Compounds) value to these composite materials and producing pollution which is harmful to the health of the users.

CN1327456A discloses a polyurethane molding body and a process for preparing the same, wherein the polyurethane composition comprises: a component comprising an unsaturated bond and an active group which is reactive to isocyanate, and a component comprising isocyanate group; and discloses the use of the above components to prepare a free radical curable molding body.

BRIEF SUMMARY OF THE INVENTION

In one aspect, the invention provides a process for preparing a polyurethane composite material, comprising steps of:

I) preparing a premolded polyurethane molding body, wherein the premolded polyurethane molding body is prepared from a polyurethane composition under a condition that isocyanate groups and isocyanate-reactive groups comprised in the polyurethane composition undergo an addition reaction, and the polyurethane composition comprises:
A) an isocyanate component comprising one or more organic polyisocyanates;
B) an isocyanate-reactive component comprising:
b1) one or more organic polyols having a functionality of 1-4, a hydroxyl number in the range from 10 to 400 mg KOH/g and an amount of 15-85 wt. %, preferably 30-70 wt. %, based on 100 wt. % by weight of the isocyanate-reactive component;
b2) one or more compounds having the formula (I) with an amount of 15-85 wt. %,

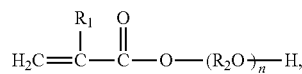

wherein $R_1$ is selected from hydrogen, methyl or ethyl; $R_2$ is selected from alkylene groups having 2-6 carbon atoms, 2,2-bis(4-phenylene) propane, 1,4-bis(methylene)benzene, 1,3-bis(methylene)benzene, and 1,2-bis(methylene) benzene; n is an integer selected from 1-6;
C) a reinforcement material; and
D) a radical reaction initiator;
II) curing the premolded polyurethane molding body to prepare the polyurethane composite material, wherein the premolded polyurethane molding body cures by the radical polymerization of active olefinic bonds.

In some embodiments of the invention, the curing step is performed at a temperature of 50-300° C. and a pressure of 0.1-50 MPa.

In some other embodiments of the invention, the content ratio of b1) to b2) ranges from 30:70 to 70:30.

In still some other embodiments of the invention, the polyurethane composite material has a TVOC value of less than 1000, determined according to the standard of VDA-277.

In yet some other embodiments of the invention, the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

In yet some other embodiments of the invention, the organic polyol has a molecule weight of 350-10000.

In yet some other embodiments of the invention, the premolded polyurethane molding body is prepared into a shape of sheet, strip, ribbon or dough before used in the curing step II).

The invention also provides a polyurethane composite material prepared according to the above process. In some embodiments of the invention, the polyurethane composite material is selected from: motor vehicle fender, vehicle lamp shade, vehicle dashboard, carport hardtop, motor vehicle door, motor vehicle skeleton, motor vehicle body shell, motor vehicle radiator grid plate, motor vehicle headlamp reflector, vehicle front-end bracket, motor vehicle floor, motor vehicle seat frame, motor vehicle shroud, motor vehicle radiator mask or bracket, motor vehicle guard, motor vehicle crossbeam, motor vehicle spoiler, motor vehicle visor, the motor vehicle front and rear bumpers, motor vehicle hood, motor vehicle trim panel, rear liftgate of a motor vehicle trunk, motor vehicle interior parts, engine valve cover, engine intake manifold, fuel tank bottom shell, motor vehicle air filter cover, motor vehicle wind shield, motor vehicle gear chamber cover, intake manifold guard, motor vehicle fan blade, motor vehicle fan, motor vehicle air-guiding loop, motor vehicle heater cover, motor vehicle water tank parts, motor vehicle water outlet housing, motor vehicle hydraulic turbine, engine baffle, motor vehicle door handle, water tank, bathtub, integrated bathroom, flooring, waterproof tray, toilet, clean sink, electrical casing, insulator, printed circuit board, electrical cable distribution channel, telephone booth framework, highway anti-glare panel and bumper upright, side of the road, cable bracket, cable transfer box, multimedia box, distribution box, cable branch box, traffic signal control box, water meter box, measuring instrument housing and internal parts, communication equipment enclosure and internal parts, antenna cover, railway vehicle sash, and train toilet assembly.

DETAILED DESCRIPTION OF THE INVENTION

The invention provides a process for preparing a polyurethane composite material, comprising steps of:

I) preparing a premolded polyurethane molding body, wherein the premolded polyurethane molding body is prepared from a polyurethane composition under a condition that isocyanate groups and isocyanate-reactive groups comprised in the polyurethane composition undergo an addition reaction, and the polyurethane composition comprises:

A) an isocyanate component comprising one or more organic polyisocyanates;

B) an isocyanate-reactive component comprising:

b1) one or more organic polyols having a functionality of 1-4, a hydroxyl number in the range from 10 to 400 mg KOH/g and an amount of 15-85 wt. %, preferably 30-70 wt. %, based on 100 wt. % by weight of the isocyanate-reactive component;

b2) one or more compounds having the formula (I) with an amount of 15-85 wt. %,

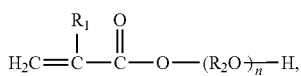

wherein $R_1$ is selected from hydrogen, methyl or ethyl; $R_2$ is selected from alkylene groups having 2-6 carbon atoms, 2,2-bis(4-phenylene) propane, 1,4-bis(methylene)benzene, 1,3-bis(methylene)benzene, and 1,2-bis(methylene) benzene; n is an integer selected from 1-6;

C) a reinforcement material; and

D) a radical reaction initiator;

II) curing the premolded polyurethane molding body to prepare the polyurethane composite material, wherein the premolded polyurethane molding body cures by the radical polymerization of active olefinic bonds.

When used in the invention, the isocyanate-reactive group comprises hydroxyl or amino group, wherein the hydroxyl group may be primary, secondary or tertiary hydroxyl group, and the amino group may be primary, secondary or tertiary amino group. In preferred embodiments of the invention, the isocyanate-reactive group is selected from hydroxyl groups which are provided by the isocyanate-reactive component. Those skilled in the art know the reaction conditions that allow the isocyanate group to react with the isocyanate-reactive group. For example, the reactants may react at an elevated temperature which is preferably not higher than 80° C. In some embodiments, a catalyst may be used to promote the above reaction, wherein the catalyst may be one conventionally used in the art to catalyze the reaction between isocyanate group (NCO) and an isocyanate-reactive group (e.g. hydroxyl group). A catalyst suitable for polyurethane reaction is preferably but not limited to an amine catalyst, an organometallic catalyst or a mixture thereof. The amine catalyst is preferably but not limited to triethylamine, tributylamine, triethylenediamine, N-ethylmorpholine, N,N,N', N'-tetramethylethylenediamine, pentamethyldiethylenetriamine, N,N-methylaniline, N,N-dimethylaniline, or a mixture thereof. The organometallic catalyst is preferably but not limited to an organotin compound, e.g. tin (II) acetate, tin (II) octanoate, tin ethylhexanoate, tin laurate, dibutyl tin oxide, dibutyl tin dichloride, dibutyl tin diacetate, dibutyl tin maleate, dioctyl tin diacetate, or a mixture thereof. The catalyst has an amount of 0.001-10 wt. %, based on 100 wt. % by weight of the isocyanate reactive component.

As used herein, an active olefinic bond refers to an olefinic bond capable of undergoing radical polymerization, excluding the olefinic bonds in an aromatic ring.

According to the invention, the premolded polyurethane molding body refers to the product after mixing the polyurethane composition, which may be made into a desired shape by a plastic processing method known in the art, such as casting, pressing, rolling or extrusion, and then cured to prepare a polyurethane composite material. In some preferred embodiments of the invention, the shape may be one of sheet, strip, ribbon and dough. After mixing, the isocyanate group and the isocyanate-reactive group (such as hydroxyl group) in the polyurethane composition begin to undergo addition polymerization of polyurethane which may proceed partially or completely before the curing step. The active olefinic bonds in the premolded polyurethane molding body remain stable at ambient temperature and will not undergo obvious radical polymerization. The active olefinic bonds in the premolded molding body will undergo radical polymerization on a large scale only under certain conditions, such as heating, which cure the premolded polyurethane molding body by crosslinking to afford a polyurethane composite material. The stability of the olefinic bonds guarantees the long-term stability of the premolded polyurethane molding body which is favorable for the storage and handling of the premolded polyurethane molding body.

In some embodiments of the invention, the premolded polyurethane molding body is a mixture that exhibits a viscosity of at least 30000 mPa·s (25° C.) or a semisolid state. In some other preferred embodiments of the invention, the premolded polyurethane molding body may be stored at 5-45° C. for more than 24 hours, preferably more than 30 days without observable physical or chemical change, and can still be used to prepare a polyurethane composite material having good properties.

Organic polyisocyanates that may be used as the component A) of the polyurethane resin composition according to the invention include organic diisocyanates which may be any aliphatic, alicyclic or aromatic isocyanates known for preparing polyurethanes. Examples include but are not limited to 2,2'-diphenylmethane diisocyanate, 2,4-diphenylmethane diisocyanate and 4,4'-diphenylmethane diisocyanate; mixtures of monomeric diphenylmethane diisocyanates and diphenylmethane diisocyanate homologs having more rings (polymerized MDI); isophorone diisocyanate (IPDI) or oligomers thereof; toluene diisocyanates (TDI), e.g. toluene diisocyanate isomers, e.g. toluene-2,4-diisocyanate or toluene-2,6-diisocyanate, or mixtures thereof; tetramethylene diisocyanate or oligomers thereof; hexamethylene diisocyanate (HDI) or oligomers thereof; naphthalene diisocyanates (NDI) or mixtures thereof.

In an embodiment of the invention, the organic polyisocyanates include diphenylmethane diisocyanate based isocyanates, particularly those comprising polymerized MDI. The functionality of the organic polyisocyanate is preferably 1.9-3.5, more preferably 2.0-2.8. The viscosity of the organic polyisocyanate is preferably 5-600 mPa·s, more preferably 10-300 mPa·s as measured at 25° C. according to DIN 53019-1-3.

The organic polyisocyanate may also be used in the form of a prepolymer of a polyisocyanate. The polyisocyanate prepolymer may be obtained by reacting an excessive amount of the organic polyisocyanate described above with a compound having at least two isocyanate-reactive groups at a temperature of, for example, 30-100° C., preferably about 80° C. The polyisocyanate prepolymer of the invention preferably has an NCO content of 12-33 wt. %, more preferably 20-32 wt. %. The compounds having at least two isocyanate-reactive groups are well known to those skilled in the art. For example, they are described in Chapter 3.1, Plastics Handbook ("Kunststoffhandbuch, 7, Polyurethanes", Carl Hanser-Verlag, 3rd Ed., 1993), which is incorporated herein in its entity by reference.

The isocyanate-reactive component B) of the polyurethane composition of the invention further comprises one or more organic polyols b1) which have a molecular weight of 350-10000 and an amount of 15-85 wt. %, preferably 30-70 wt. %, based on 100 wt. % by weight of the isocyanate-reactive component. The organic polyols have a hydroxyl number in the range of 10-400 mg KOH/g, preferably 28-350 mgKOH/g; a functionality of 1-4, preferably 1.5-3, more preferably 1.8-2.5; and an amount of 15-85 wt. %, preferably 30-70 wt. %, based on 100 wt. % by weight of the isocyanate-reactive component.

The organic polyols may be those commonly used to prepare polyurethane in the art, including but not limited to polyether polyols, polyethercarbonate polyols, polyester polyols, polycarbonate diols, vegetable oil polyols or combinations thereof.

The polyether polyol may be prepared by a known process, for example, by reacting an olefin oxide with a starter in the presence of a catalyst. The catalyst is preferably but not limited to an alkaline hydroxide, an alkaline alkoxide, antimony pentachloride, boron trifluoride-diethyl etherate or a combination thereof. The olefin oxide is preferably but not limited to tetrahydrofuran, ethylene oxide, propylene oxide, 1,2-butylene oxide, 2,3-butylene oxide, styrene oxide, or a combination thereof; preferably ethylene oxide and/or propylene oxide. The starter is preferably but not limited to a polyhydroxy compound or a polyamino compound, wherein the polyhydroxy compound is preferably but not limited to water, ethylene glycol, 1,2-propanediol, 1,3-propanediol, diethylene glycol, trimethylolpropane, glycerine, bisphenol A, bisphenol S or a combination thereof, and the polyamino compound is preferably but not limited to ethylene diamine, propanediamine, butanediamine, hexanediamine, diethylene triamine, toluene diamine or a combination thereof. The polyether polyol may also be unsaturated.

The polyethercarbonate polyol, which may be prepared by addition of carbon dioxide and an alkylene oxide compound to a starter comprising active hydrogen in the presence of a double metal cyanide catalyst, may also be used in the invention.

The polyester polyol is prepared by reaction between a dibasic carboxylic acid or a dibasic carboxylic anhydride and a polyol. The dibasic carboxylic acid is preferably but not limited to an aliphatic carboxylic acid having 2-12 carbons, preferably but not limited to succinic acid, malonic acid, glutaric acid, adipic acid, suberic acid, azelaic acid, sebacic acid, dodecanoic acid, maleic acid, fumaric acid, phthalic acid, isophthalic acid, terephthalic acid, or a combination thereof. The dibasic carboxylic anhydride is preferably but not limited to phthalic anhydride, tetrachlorophthalic anhydride, maleic anhydride or a combination thereof. The polyol that reacts with the dibasic carboxylic acid or anhydride is preferably but not limited to ethylene glycol, diethylene glycol, 1,2-propanediol, 1,3-propanediol, dipropylene glycol, 1,3-methylpropanediol, 1,4-butanediol, 1,5-pentanediol, 1,6-hexanediol, neopentyl glycol, 1,10-decanediol, glycerine, trimethylolpropane, or a combination thereof. The polyester polyol also includes a polyester polyol prepared from a lactone. The polyester polyol prepared from a lactone is preferably but not limited to 8-caprolactone.

The polycarbonate diol may be prepared by reacting a diol with a dihydrocarbyl carbonate or a diaryl carbonate or phosgene. The diol is preferably but not limited to 1,2-propanediol, 1,3-propanediol, 1,4-butanediol, 1,5-pentanediol, 1,6-hexanediol, diethylene glycol, trioxymethylene diol or a mixture thereof. The dihydrocarbyl or diaryl carbonate is preferably but not limited to diphenyl carbonate.

The vegetable oil based polyol, when used in the invention, includes vegetable oils, vegetable oil polyols or modified products thereof. Vegetable oil is a compound prepared from an unsaturated fatty acid and glycine, or an oil extracted from plant fruits, seeds or embryos, which is preferably but not limited to peanut oil, bean oil, linseed oil, castor oil, rape seed oil and palm oil. The vegetable oil polyol is a polyol originated from one or more vegetable oils. A starter for synthesis of a vegetable oil polyol includes but is not limited to soybean oil, palm oil, peanut oil, canola oil and castor oil. Hydroxyl group may be introduced into the starter of a vegetable oil polyol by a process such as cracking, oxidation or transesterification, and then the corresponding vegetable oil polyol may be prepared using a process known to those skilled in the art for preparing an organic polyol.

The methods for measuring hydroxyl number are well known to those skilled in the art and are disclosed by, for example, Houben Weyl, Methoden der Organischen Chemie, vol. XIV/2 Makromolekulare Stoffe, p. 17, Georg Thieme Verlag; Stuttgart 1963, which is incorporated herein in its entity by reference.

Unless otherwise specified, the functionality and the hydroxyl number of an organic polyol as used herein refer to an average functionality and an average hydroxyl group respectively.

In an embodiment of the invention, the isocyanate-reactive component further comprises one or more compounds b2) having formula (I):

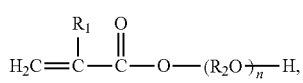

$$H_2C=\underset{R_1}{\overset{}{C}}-\overset{O}{\overset{\|}{C}}-O-(R_2O)_{\overline{n}}-H, \qquad I$$

wherein $R_1$ is selected from hydrogen, methyl or ethyl; $R_2$ is selected from alkylene groups having 2-6 carbon atoms; and n is an integer selected from 1-6.

In a preferred embodiment of the invention, $R_2$ is selected from ethylene, trimethylene, tetramethylene, pentamethylene, 1-methyl-1,2-ethylene, 2-methyl-1,2-ethylene, 1-ethyl-1,2-ethylene, 2-ethyl-1,2-ethylene, 1-methyl-1,3-propylene, 2-methyl-1,3-propylene, 3-methyl-1,3-propylene, 1-ethyl-1,3-propylene, 2-ethyl-1,3-propylene, 3-ethyl-1,3-propylene, 1-methyl-1,4-butylene, 2-methyl-1,4-butylene, 3-methyl-1,4-butylene, 4-methyl-1,4-butylene, 2,2-di(4-phenylene)-propane, 1,4-dimethylene benzene, 1,3-dimethylene benzene, and 1,2-dimethylene benzene.

In a preferred embodiment of the invention, the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

The compound of structure (I) may be prepared using a conventional method in the art, e.g. by esterification reaction between (meth)acrylic anhydride, (meth)acrylic acid or (meth)acryloyl halide and HO—$(R_2O)_n$—H. This method is known to those skilled in the art. See, for example, the description in Chapter 3, Handbook of Polyurethane Raw Materials And Aids (Liu Yijun, published on Apr. 1, 2005) and Chapter 2, Polyurethane Elastomer (Liu Houjun, published in August, 2012), which are incorporated herein in their entity by reference.

The polyurethane composition of the invention further comprises a reinforcement material C). In an embodiment of the invention, the reinforcement material is selected from fiber reinforcement materials, carbon nanotubes, hard particle fillers and combinations thereof, more preferably fiber reinforcement materials. The reinforcement material has an amount of 5-95 wt. %, preferably 30-85 wt. %, based on 100 wt. % by weight of the polyurethane composite material.

When used in the invention, the fiber reinforcement material is not limited in shape and size. For example, it may be a continuous fiber, a staple fiber, a fiber net formed by bonding, or a fibrous fabric.

In some embodiments of the invention, the fiber reinforcement material is selected from the group consisting of glass fibers, carbon fibers, polyester fibers, natural fibers, aramid fibers, nylon fibers, basalt fibers, boron fibers, silicon carbide fibers, asbestos fibers, whiskers, metal fibers and combinations thereof.

In some embodiments of the invention, the filler is selected from the group consisting of aluminum hydroxide, bentonite, fly ash, wollastonite, perlite powder, fly ash floating beads, calcium carbonate, talc powder, mica powder, porcelain clay, fumed silica, expandable microspheres, diatomite, pozzuolana, barium sulfate, calcium sulfate, glass microspheres, rock powder, wood flour, wood chips, bamboo flour, bamboo chips, rice grains, chopped crop straw, chopped broomcorn straw, graphite powder, metal powder, recycled powder of thermosetting composite materials, plastic particles or powder, or combinations thereof. The glass microspheres may be solid or hollow.

In an embodiment of the invention, the polyurethane composition further comprises D) a radical reaction initiator. The radical reaction initiator used in the invention may be added into the isocyanate-reactive component or the isocyanate component or both. The initiator includes but is not limited to peroxides, persulfides, peroxycarbonates, peroxyboric acid, azo compounds or other suitable radical initiators that can initiate curing of an olefinic bond-containing compound. Typical examples include tert-butylperoxy isopropyl carbonate, benzoyl peroxide, tert-butylperoxy 3,5,5-trimethylhexanoate, methyl ethyl ketone peroxide, cumene hydroperoxide, dicumyl peroxide, etc.

Generally, the radical reaction initiator has an amount of 0.1-8 wt. %, based on 100 wt. % by weight of the isocyanate reactive component. In addition, optionally, there may also be one or more promoters, such as cobalt compounds or amine compounds.

In an embodiment of the invention, the radical polymerization reaction is an addition polymerization based on olefinic bond, wherein the olefinic bond may be one carried by component b2), or one carried by the intermediate product of the reaction between component b2) and the organic polyisocyanate.

In an embodiment of the invention, the polyurethane composition may also comprise an aid or an additive, including but not limited to fillers, inner release agents, flame retardants, smoke suppressants, dyes, pigments, antistatic agents, antioxidants, UV stabilizers, diluents, antifoam agents, coupling agents, surface wetting agents, leveling agents, moisture scavengers, catalysts, molecular sieves, thixotropic agents, plasticizers, blowing agents, foam stabilizers, foam homogenizers, radical reaction suppressants, or combinations thereof, which may be optionally included in isocyanate component A) and/or isocyanate-reactive component B). These ingredients may also be stored separately as component E). When used to prepare the polyurethane composite material, component E) may be mixed with isocyanate component A) and/or isocyanate-reactive component B) prior to the preparation.

Inner release agents suitable for the invention include any conventional release agents for manufacturing polyurethane, and examples include long-chain carboxylic acids, particularly fatty acids, such as stearic acid; amides of long-chain carboxylic acids, such as stearamide; fatty acid esters; metal salts of long-chain carboxylic acids, such as zinc stearate; or polysiloxanes.

Examples of flame retardants suitable for the invention include triaryl phosphates, trialkyl phosphates, triaryl or trialkyl phosphates containing halogen, melamine, melamine resin, halogenated paraffin, red phosphorus or combinations thereof.

Other aids suitable for the invention include moisture scavengers, such as molecular sieves; antifoaming agents, such as polydimethylsiloxane; coupling agents, such as monoethylene oxide or organoamine functionalized trialkoxysilane or combinations thereof. A coupling agent is particularly preferred for enhancing the binding strength between a resin matrix and a fibrous reinforcement material. A fine filler, for example, clay or fumed silica, is usually used as a thixotropic agent.

Radical reaction suppressants suitable for the invention include polymerization inhibitors, polymerization retarders and the like, such as some phenol, quinine or hindered amine compounds, examples of which include methylhydroquinone, p-methoxyphenol, benzoquinone, polymethyl piperidine derivatives, low valence copper ions, etc.

In a preferred embodiment of the invention, the composite material prepared from the polyurethane composition has a TVOC value of less than 1000, preferably less than 500, more preferably less than 200, determined according to the standard of VDA-277. As used herein, TVOC refers to volatile organic compounds having a melting point of lower than room temperature and a boiling point in the range of 50-260° C., generally organic compounds having less than 16 carbons. A TVOC value of less than 1000 indicates that the polyurethane composition comprises few or no volatile organic compounds, such as toluene, xylene, p-dichlorobenzene, ethylbenzene, styrene, diphenylethylene, formaldehyde, acetaldehyde, methyl methacrylate, and other small molecular volatile organic compounds commonly present in the composite materials prepared from unsaturated polyester resin.

The process of the invention further includes step II), i.e. the step of curing the premolded polyurethane molding body to prepare the polyurethane composite material, wherein the premolded polyurethane molding body cures by the radical polymerization of the active olefinic bonds therein. The curing step may be performed under heating or irradiation, optionally promoted by providing a pressure. In a preferred embodiment of the invention, the curing step is performed at a temperature in the range of 80-250° C., preferably 120-200° C. and a pressure in the range of 0.1-50 MPa, preferably 1-20 MPa.

In some embodiments of the invention, the polyurethane composite material is prepared by a sheet molding process or a bulk molding process, wherein the polyurethane composition is mixed and processed into a premolded polyurethane molding body in the shape of sheet or dough, and the premolded polyurethane molding body is disposed in a mold where the premolded polyurethane molding body cures at certain temperature and pressure to form the desired polyurethane composite material.

The invention also provides a polyurethane composite material prepared according to the above process. In an embodiment of the invention, the polyurethane composite material is selected from: motor vehicle fender, vehicle lamp shade, vehicle dashboard, carport hardtop, motor vehicle door, motor vehicle skeleton, motor vehicle body shell, motor vehicle radiator grid plate, motor vehicle headlamp reflector, vehicle front-end bracket, motor vehicle floor, motor vehicle seat frame, motor vehicle shroud, motor vehicle radiator mask or bracket, motor vehicle guard, motor vehicle crossbeam, motor vehicle spoiler, motor vehicle visor, the motor vehicle front and rear bumpers, motor vehicle hood, motor vehicle trim panel, rear liftgate of a motor vehicle trunk, motor vehicle interior parts, engine valve cover, engine intake manifold, fuel tank bottom shell, motor vehicle air filter cover, motor vehicle wind shield, motor vehicle gear chamber cover, intake manifold guard, motor vehicle fan blade, motor vehicle fan, motor vehicle air-guiding loop, motor vehicle heater cover, motor vehicle water tank parts, motor vehicle water outlet housing, motor vehicle hydraulic turbine, engine baffle, motor vehicle door handle, water tank, bathtub, integrated bathroom, flooring, waterproof tray, toilet, clean sink, electrical casing, insulator, printed circuit board, electrical cable distribution channel, telephone booth framework, highway anti-glare panel and bumper upright, side of the road, cable bracket, cable transfer box, multimedia box, distribution box, cable branch box, traffic signal control box, water meter box, measuring instrument housing and internal parts, communication equipment enclosure and internal parts, antenna cover, railway vehicle sash, and train toilet assembly.

The invention will be further illustrated with reference to the following specific Examples. However, it is to be appreciated that these Examples are only intended to illustrate the invention without limiting the scope of the invention.

EXAMPLES

The test methods in the following Examples for which no specific conditions are indicated will be carried out generally under conventional conditions or under those conditions suggested by the manufacturers. All percentages and parts are based on weight unless otherwise specified.

The starting materials used in the Examples are listed as follows:

Desmodur PF: NCO %: 22.8%, viscosity 600 mPa·s@25° C., available from Bayer Material Science Corporate;

Desmodur 1511L: NCO %: 30.5-32.5%, viscosity: 160-240 mPa·s@25° C., available from Bayer Material Science Corporate;

Polyether polyol 1: a polyol having a hydroxyl number of 28, a functionality of 2, a viscosity of 880 mP·s@25° C. and a molecular weight of 4000, prepared by using propylene glycol as a starter and propylene oxide and ethylene oxide as the main polymerization components;

Polyether polyol 2: a polyol having a hydroxyl number of 56, a functionality of 2, a viscosity of 330 mP·s@25° C. and a molecular weight of 2000, prepared by using propylene glycol as a starter and propylene oxide as the main polymerization component;

Polyether polyol 3: a polyol having a hydroxyl number of 112, a functionality of 2, a viscosity of 150 mP·s@25° C. and a molecular weight of 1000, prepared by using propylene glycol as a starter and propylene oxide as the main polymerization component;

Polyether polyol 4: a polyol having a hydroxyl number of 280, a functionality of 2, a viscosity of 70 mP·s@25° C. and a molecular weight of 400, prepared by using propylene glycol as a starter and propylene oxide as the main polymerization component;

Polyether polyol 5: a polyol having a hydroxyl number of 470, a functionality of 3, a viscosity of 475 mP·s@25° C. and a molecular weight of 350, prepared by using glycerine as a starter and propylene oxide as the main polymerization component;

Polyether polyol 6: a polyol having a hydroxyl number of 350, a functionality of 3, a viscosity of 300 mP·s@25° C. and a molecular weight of 480, prepared by using glycerine as a starter and propylene oxide as the main polymerization component;

Polyether polyol 7: a polyol having a hydroxyl number of 380, a functionality of 5.8, a viscosity of 11250 mP·s@25° C. and a molecular weight of 850, prepared by using sucrose and propylene glycol as starters and propylene oxide as the main polymerization component;

Hydroxypropyl methacrylate (HPMA): available from Shanghai Pharma Group;

Benzoyl peroxide (BPO): available from Syrgis Co.;

Tert-butylperoxy benzoate (TBPB): available from Syrgis Co.;

Dicumyl peroxide: available from Syrgis Co.;

Zinc stearate: available from Sinopharm Chemical Reagent Co., Ltd;

ER55M-4800: staple glass fiber, available from Chongqing Polycomp International Corp.;

AT-0026: talc powder, available from Jiangxi Aote Fine Powder Handling Co., Ltd.

Comparative Examples C1-C5

A homogeneous low viscosity resin solution was formed by mixing and stirring fully according to the formulations listed in Table 1. Immediately, the above resin solution was mixed quickly with the talc powder (zinc stearate) at a ratio of resin/talc powder (zinc stearate)=3/4 to prepare a paste having a relatively high viscosity, followed instantly by quick mixing of the paste with the glass fiber at a ratio of paste/glass fiber=7/3. All of the steps were completed within 30 minutes.

The mixing procedure was conducted specifically as follows: the staple glass fiber (30 mm) was laid on a membrane; the paste was poured onto the glass fiber which was then covered with another membrane; subsequently, the membrane was rolled repeatedly with a rubber stick till the glass fiber was saturated with the paste completely; and finally, the resulting sheet was placed into an oven at 40° C. and cured for 12 hours. The sheet was taken out and the preparation of an SMC sheet was finished. The prepared sheet molding compound (SMC) can be stored at 25° C. for more than 3 months.

Prior to use, the two membranes on the upper and lower sides were removed. An appropriate weight of the sheet was cut and placed into a mold for thermal compression molding, wherein the mold temperature was about 150° C. and the pressure was 10 MPa.

TABLE 1

Formulations of Comparative Example resins and preparation of composite materials

| | Material name | C1 | C2 | C3 | C4 | C5 |
|---|---|---|---|---|---|---|
| Resin component (weight ratio) | HPMA | 100 | 50 | 50 | 90 | 10 |
| | Polyether 5 | | | 50 | | |
| | Polyether 7 | | 50 | | | |
| | Polyether 1 | | | | 10 | |
| | Polyether 4 | | | | | 90 |
| | Benzoyl peroxide | 0.25 | 0.25 | 0.25 | 0.25 | 0.25 |
| | Tert-butylperoxy benzoate | 0.25 | 0.25 | 0.25 | 0.25 | 0.25 |
| | Dicumyl peroxide | 0.25 | 0.25 | 0.25 | 0.25 | 0.25 |
| | Desmodur 1511L | 97.6 | 96.4 | 107.7 | 88.6 | 72.9 |
| | Isocyanate index | 105 | 105 | 105 | 105 | 105 |
| SMC sheet formulation | Resin component | 30 g | 30 g | 30 g | 30 g | 30 g |
| | Zinc stearate | 2 g | 2 g | 2 g | 2 g | 2 g |
| | Talc powder | 40 g | 40 g | 40 g | 40 g | 40 g |
| | Staple glass fiber | 30 g | 30 g | 30 g | 30 g | 30 g |
| | SMC sheet | The sheet was too hard to be cut | The sheet was too hard to be cut | The sheet was too hard to be cut | The sheet was too hard to be cut | The sheet was soft enough to be cut |
| | SMC molded article | / | / | / | / | The article was too soft to be released from the mold at high temperature |

Examples E1-E9

The raw materials were mixed according to the formulations listed in Table 2, and an initiator was added at a certain ratio, followed by full mixing and stirring to form a homogeneous low viscosity resin solution. Immediately, the above resin solution was mixed quickly with the talc powder (zinc stearate) at a ratio of resin/talc powder (zinc stearate)=3/4 to prepare a paste having a relatively high viscosity, followed instantly by quick mixing of the paste with the glass fiber at a ratio of paste/glass fiber=7/3 to prepare a sheet. All of the steps were completed within 30 minutes. Finally, the sheet was placed into an oven at 40° C. and cured for 12 hours. The sheet was taken out and the preparation of an SMC sheet was finished. The prepared sheet can be stored at 25° C. for more than 3 months.

The mixing procedure was conducted specifically as follows: the staple glass fiber (30 mm) was laid on a membrane; the paste was poured onto the glass fiber which was then covered with another membrane; subsequently, the membrane was rolled repeatedly with a rubber stick till the glass fiber was saturated with the paste completely.

Prior to use, the two membranes on the upper and lower sides were removed. An appropriate weight of the sheet was cut and placed into a mold for thermal compression molding, wherein the mold temperature was about 150° C., the pressure was 10 MPa, and the molding time was 3 minutes. After cooling, the TVOC values of the SMC articles were measured according to the standard of VDA277.

TABLE 2

| | Material name | E1 | E2 | E3 | E4 | E5 | C6* |
|---|---|---|---|---|---|---|---|
| Resin formulation | HPMA | 85 | 70 | 50 | 30 | 15 | |
| | Polyether 1 | 15 | | | | | |
| | Polyether 2 | | 30 | | | | |
| | Polyether 3 | | | | 30 | 15 | |
| | Polyether 4 | | | 50 | 40 | 50 | |
| | Polyether 6 | | | | | 20 | |
| | Benzoyl peroxide | 0.25 | | 0.5 | | | |
| | Tert-butylperoxy benzoate | 0.25 | 0.75 | | | 0.75 | |
| | Dicumyl peroxide | 0.25 | | 0.25 | 0.75 | 0.25 | |
| | Desmodur 1511L | | 72.6 | | 65.7 | 71.4 | |
| | Desmodur PF | 114.7 | | 114.5 | | | |
| | Isocyanate index | 105 | 105 | 105 | 105 | 105 | |
| SMC sheet formulation | Resin component | 30 g | 30 g | 30 g | 30 g | 30 g | |
| | Zinc stearate | 2 g | 2 g | 2 g | 2 g | 2 g | |
| | Talc powder | 40 g | 40 g | 40 g | 40 g | 40 g | |
| | Staple glass fiber | 30 g | 30 g | 30 g | 30 g | 30 g | |
| | SMC sheet | The sheet was slightly stiff but could still be cut | The sheet was soft enough to be cut | The sheet was soft enough to be cut | The sheet was soft enough to be cut | The sheet was soft enough to be cut | |
| | SMC molded article | Successful release at high temperature | Successful release at high temperature | Successful release at high temperature | Successful release at high temperature | Releasable at high temperature | |
| | TVOC of molded article | 159 | 164 | 90 | 142 | 190 | 1000 |

*C6, i.e. DICMAT 5005, an unsaturated polyester SMC sheet, available from Changzhou Huari New Material Co., Ltd.

What is claimed is:

1. A process for preparing a polyurethane composite material, comprising:

I) preparing a premolded polyurethane molding body, wherein the premolded polyurethane molding body is prepared from a polyurethane composition under a condition that isocyanate groups and isocyanate-reactive groups comprised in the polyurethane composition undergo an addition reaction, and wherein the polyurethane composition consists of:

A) an isocyanate component comprising one or more organic polyisocyanates;

B) an isocyanate-reactive component consisting of:

b1) one or more organic polyols selected from the group consisting of polyether polyols, polyethercarbonate polyols, polyester polyols, polycarbonate diols, and vegetable oil polyols having a functionality of 1-4, a hydroxyl number in the range from 10 to 400 mg KOH/g, and an amount of 15-85 wt. % based on 100% by weight of the isocyanate-reactive component;

b2) one or more compounds having the formula (I) with an amount of 15-85 wt. % based on 100% by weight of the isocyanate-reactive component,

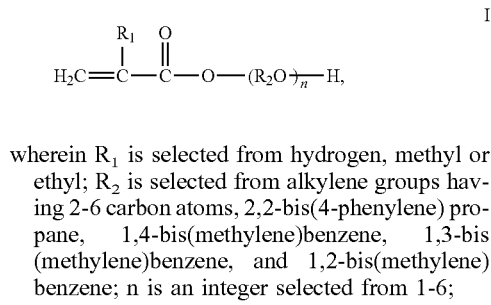

wherein $R_1$ is selected from hydrogen, methyl or ethyl; $R_2$ is selected from alkylene groups having 2-6 carbon atoms, 2,2-bis(4-phenylene) propane, 1,4-bis(methylene)benzene, 1,3-bis(methylene)benzene, and 1,2-bis(methylene) benzene; n is an integer selected from 1-6;

C) a reinforcement material;

D) a radical reaction initiator; and

E) an aid or additive;

and wherein the premolded polyurethane molding body is prepared into a shape before used in the curing step II);

II) curing the premolded polyurethane molding body at a temperature of 80-250° C. and a pressure of 0.1-50 MPa to prepare the polyurethane composite material, wherein the premolded polyurethane molding body cures by the radical polymerization of active olefinic bonds.

2. The process according to claim 1, wherein the content ratio by weight of b1) to b2) ranges from 30:70 to 70:30.

3. The process according to claim 1, wherein the polyurethane composite material has a Total Volatile Organic Compounds value of less than 1000, determined according to the standard of VDA-277.

4. The process according to claim 1, wherein the component b2) is selected from the group consisting of hydroxyethyl methacrylate, hydroxypropyl methacrylate, hydroxybutyl methacrylate, hydroxyethyl acrylate, hydroxypropyl acrylate, hydroxybutyl acrylate and combinations thereof.

5. The process according to claim 1, wherein the pre-molded polyurethane molding body is prepared into a shape of sheet, strip, ribbon or dough before used in the curing step II).

6. A polyurethane composite material, wherein the polyurethane composite material is prepared by the process according to claim 1.

7. The polyurethane composite material according to claim 6, wherein the polyurethane composite material is selected from the group consisting of motor vehicle fender, vehicle lamp shade, vehicle dashboard, carport hardtop, motor vehicle door, motor vehicle skeleton, motor vehicle body shell, motor vehicle radiator grid plate, motor vehicle headlamp reflector, vehicle front-end bracket, motor vehicle floor, motor vehicle seat frame, motor vehicle shroud, motor vehicle radiator mask, motor vehicle bracket, motor vehicle guard, motor vehicle cross beam, motor vehicle spoiler, motor vehicle visor, motor vehicle front and rear bumpers, motor vehicle hood, motor vehicle trim panel, rear liftgate of a motor vehicle trunk, motor vehicle interior parts, engine valve cover, engine intake manifold, fuel tank bottom shell, motor vehicle air filter cover, motor vehicle wind shield, motor vehicle gear chamber cover, intake manifold guard, motor vehicle fan blade, motor vehicle fan, motor vehicle air-guiding loop, motor vehicle heater cover, motor vehicle water tank parts, motor vehicle water outlet housing, motor vehicle hydraulic turbine, engine baffle, motor vehicle door handle, water tank, bathtub, integrated bathroom, flooring, waterproof tray, toilet, clean sink, electrical casing, insulator, printed circuit board, electrical cable distribution channel, telephone booth framework, highway anti-glare panel and bumper upright, cable bracket, cable transfer box, multimedia box, distribution box, cable branch box, traffic signal control box, water meter box, measuring instrument housing and internal parts, communication equipment enclosure and internal parts, antenna cover, railway vehicle sash, and train toilet assembly.

* * * * *